(12) United States Patent
Bartucca

(10) Patent No.: US 6,658,510 B1
(45) Date of Patent: Dec. 2, 2003

(54) SOFTWARE METHOD TO RETRY ACCESS TO PERIPHERALS THAT CAN CAUSE BUS TIMEOUTS DURING MOMENTARY BUSY PERIODS

(75) Inventor: Francis Michael Bartucca, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 09/691,001

(22) Filed: Oct. 18, 2000

(51) Int. Cl.[7] .............................................. G06F 13/14
(52) U.S. Cl. ............................ 710/107; 710/17; 714/56
(58) Field of Search .............. 714/55, 56; 710/107–125, 710/15–19

(56) References Cited

U.S. PATENT DOCUMENTS

| | | | |
|---|---|---|---|
| 3,997,896 A | * 12/1976 | Cassarino et al. | 710/114 |
| 4,245,299 A | * 1/1981 | Woods et al. | 713/601 |
| 4,872,110 A | * 10/1989 | Smith et al. | 714/55 |
| 4,947,316 A | * 8/1990 | Fisk et al. | 710/105 |
| 5,193,181 A | 3/1993 | Barlow et al. | |
| 5,287,362 A | * 2/1994 | Liencres | 714/55 |
| 5,495,585 A | 2/1996 | Datwyler et al. | |
| 5,572,734 A | 11/1996 | Narad et al. | |
| 5,644,733 A | 7/1997 | Kalish et al. | |
| 5,682,551 A | * 10/1997 | Pawlowski et al. | 710/36 |
| 5,706,446 A | 1/1998 | Kalish et al. | |
| 5,761,445 A | 6/1998 | Nguyen | |
| 5,764,935 A | 6/1998 | Bechtolsheim et al. | |
| 5,768,620 A | * 6/1998 | Johnson et al. | 710/15 |
| 5,923,858 A | 7/1999 | Kanekal | |
| 5,941,967 A | 8/1999 | Zulian | |
| 6,000,040 A | * 12/1999 | Culley et al. | 714/31 |
| 6,496,890 B1 | * 12/2002 | Azevedo et al. | 710/110 |

FOREIGN PATENT DOCUMENTS

| | | | | |
|---|---|---|---|---|
| JP | 02208715 A | * | 8/1990 | G06F/3/06 |
| JP | 7175729 | | 7/1995 | |

* cited by examiner

Primary Examiner—Sumati Lefkowitz
(74) Attorney, Agent, or Firm—Sawyer Law Group, LLP; Carlos Munoz-Bustamante

(57) ABSTRACT

The present invention provides an improved method and system for managing peripheral bus timeouts. The method includes: sending a request to a peripheral in a performance of a task; determining that a peripheral bus timeout occurred; sending an interrupt signal; retrying for an access to the peripheral; completing the request if the retry for the access to the peripheral is successful; and resuming the performance of the task. The present invention provides a software method in which an input/output (I/O) request to a peripheral is sent by a recoverable access routine. When a bus timeout occurs, a hung bus detector asserts an interrupt signal. The peripheral bus is freed from the hung condition. The recoverable access routine is suspended, and a bus timeout interrupt handler is then loaded. The interruption and the freeing of the peripheral bus frees the microprocessor from the processing of the I/O request so that other requests may be performed. During the suspension of the recoverable access routine, a retry routine retries the I/O request. If the retry routine is successful in completing the I/O request, the result of the request is provided to the recoverable access routine, and the recoverable access routine is resumed to complete the task. In this manner, a peripheral bus timeout is managed without the need to reset the device hardware.

28 Claims, 4 Drawing Sheets

SOFTWARE METHOD TO RETRY ACCESS TO PERIPHERALS THAT CAN CAUSE BUS TIMEOUTS DURING MOMENTARY BUSY PERIODS

FIELD OF THE INVENTION

The present invention relates to peripheral devices in a computer system, and more particularly to accessing peripheral devices in a computer system.

BACKGROUND OF THE INVENTION

The accessing of peripherals by a microprocessor is well known in the art. Typically, an input/output (I/O) request, i.e., request for writing/reading of data, is sent from the microprocessor to the peripheral via a peripheral bus. In many peripheral bus designs, when a peripheral is addressed by the microprocessor, that peripheral is expected to return an indication onto the peripheral bus that it is ready to accept or supply data. There is a certain period of time during which a hung bus detector will wait for this indication from the peripheral. This is commonly referred to as the "bus timeout period". If the bus timeout period is exceeded before the indication is received from the peripheral, typically the peripheral is assumed to be too busy or has encountered an error. This is commonly referred to as a "hung" condition. Conventionally, some part of the hardware of the microprocessor's device is then reset to free the hung condition. Each time the hardware is reset, a certain amount of device down time is wasted.

Also, with complex computer systems, such as with network communications devices, peripherals connected to the microprocessor via the peripheral bus are often complex "application specific integrated circuits", or ASICs, that themselves interface with multiple devices and run complex state machines at the same time. This complexity can increase the variability in response time to I/O requests from the microprocessor, especially if the ASIC must also process highly variable network traffic.

Accordingly, there exists a need for an improved method and system for managing peripheral bus timeouts. The improved method and system should avoid unnecessary resetting of the device hardware. The present invention addresses such a need.

SUMMARY OF THE INVENTION

The present invention provides an improved method and system for managing peripheral bus timeouts. The method includes: sending a request to a peripheral in a performance of a task; determining that a peripheral bus timeout occurred; sending an interrupt signal; retrying for an access to the peripheral; completing the request if the retry for the access to the peripheral is successful; and resuming the performance of the task. The present invention provides a software method in which an input/output (I/O) request to a peripheral is sent by a recoverable access routine. When a bus timeout occurs, a hung bus detector asserts an interrupt signal. The peripheral bus is freed from the hung condition. The recoverable access routine is suspended, and a bus timeout interrupt handler is then loaded. The interruption and the freeing of the peripheral bus frees the microprocessor from the processing of the I/O request so that other requests may be performed. During the suspension of the recoverable access routine, a retry routine retries the I/O request. If the retry routine is successful in completing the I/O request, the result of the request is provided to the recoverable access routine, and the recoverable access routine is resumed to complete the task. In this manner, a peripheral bus timeout is managed without the need to reset the device hardware.

DETAILED DESCRIPTION

The present invention provides improved method and system for managing peripheral bus timeouts. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a software method in which an input/output (I/O) request to a peripheral is sent by a recoverable access routine. When a peripheral bus timeout occurs, a hung bus detector asserts an interrupt signal. The peripheral bus is freed from the hung condition. The recoverable access routine is suspended, and a bus timeout interrupt handler is then loaded. The interruption and freeing of the peripheral bus frees the microprocessor from the processing of the I/O request so that other tasks may be performed. The bus timeout interrupt handler determines that the interrupt occurred during the execution of the recoverable access routine. A retry routine then retries the I/O request. If the retry routine is able to obtain access, the I/O request is completed, the result of the request is provided to the recoverable access routine, and the recoverable access routine is resumed to complete the task. In this manner, a peripheral bus timeout is managed without the need to reset the device hardware.

To more particularly describe the features of the present invention, please refer to FIGS. 1 through 4 in conjunction with the discussion below.

Figure 1:
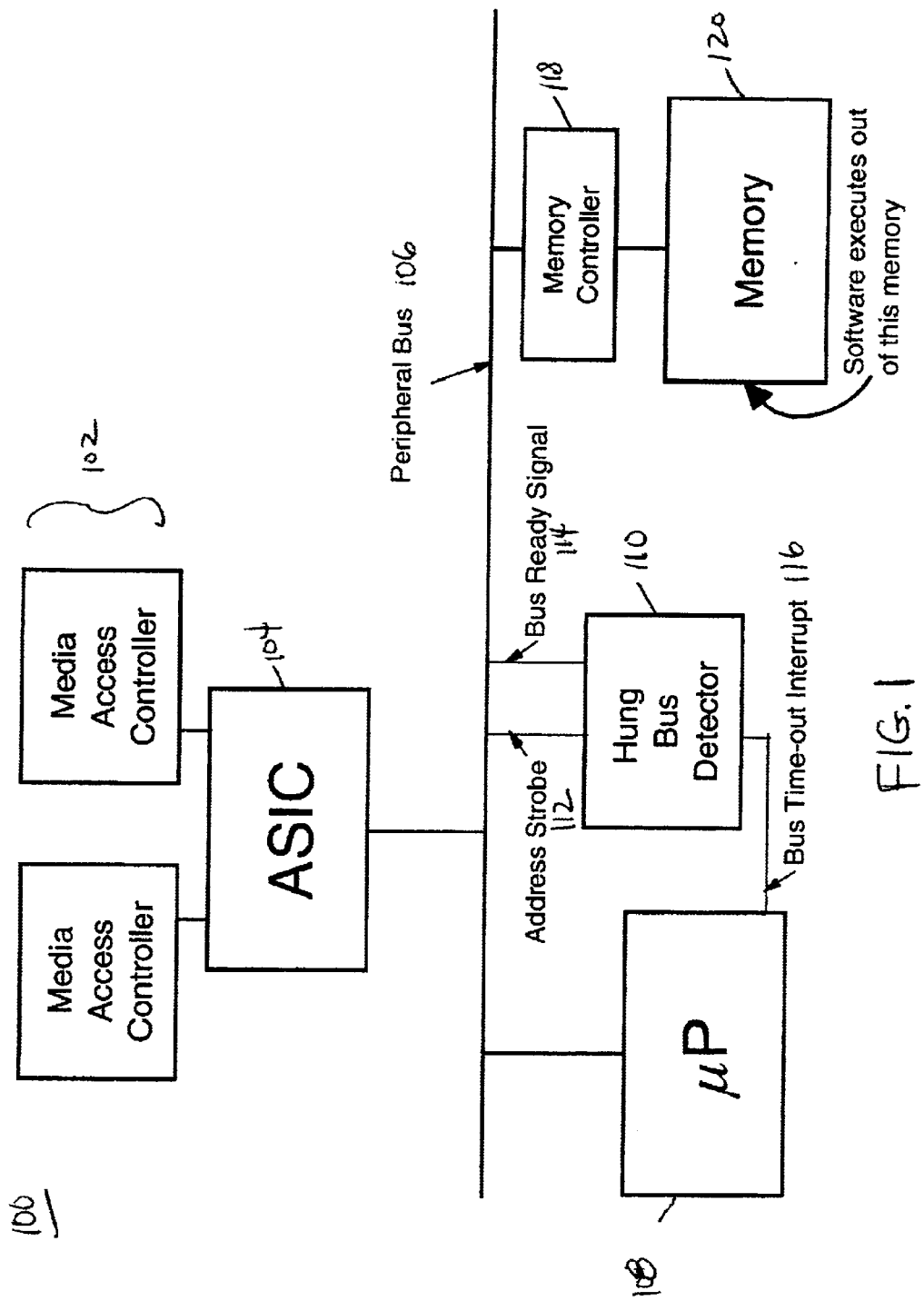
FIG. 1 is a block diagram of the hardware structure of a device which utilizes the method and system for managing peripheral bus timeouts in accordance with the present invention.

FIG. 1 is a block diagram of the hardware structure of a device which utilizes the method and system for managing peripheral bus timeouts in accordance with the present invention. The device 100 comprises a peripheral bus 106. Coupled to the peripheral bus 106 is a peripheral in the form of an Application Specific Integrated Circuit 104 (ASIC). The ASIC 104 may interface with multiple devices 102, such as Media Access Controllers. Also coupled to the peripheral bus 106 is a microprocessor 108 which may send input/output (I/O) requests to the peripheral 104 through the peripheral bus 106. The microprocessor 108 also executes software which resides in the memory 120. The memory controller 118 manages the contents of the memory 120. The hung bus detector 110 monitors the peripheral bus 106. It starts a timer when the address strobe 112 indicates that the microprocessor 108 has sent an I/O request onto the peripheral bus 106. If the timer expires without the peripheral 104 asserting a ready signal on the peripheral bus 106, then the hung bus detector 110 generates an interrupt signal to the microprocessor 108 via the bus timeout interrupt 116. The hung bus detector 110 can also assert its own bus ready signal 114 onto the peripheral bus 106 to free up the microprocessor 108 from a pending I/O request.

Figure 2:
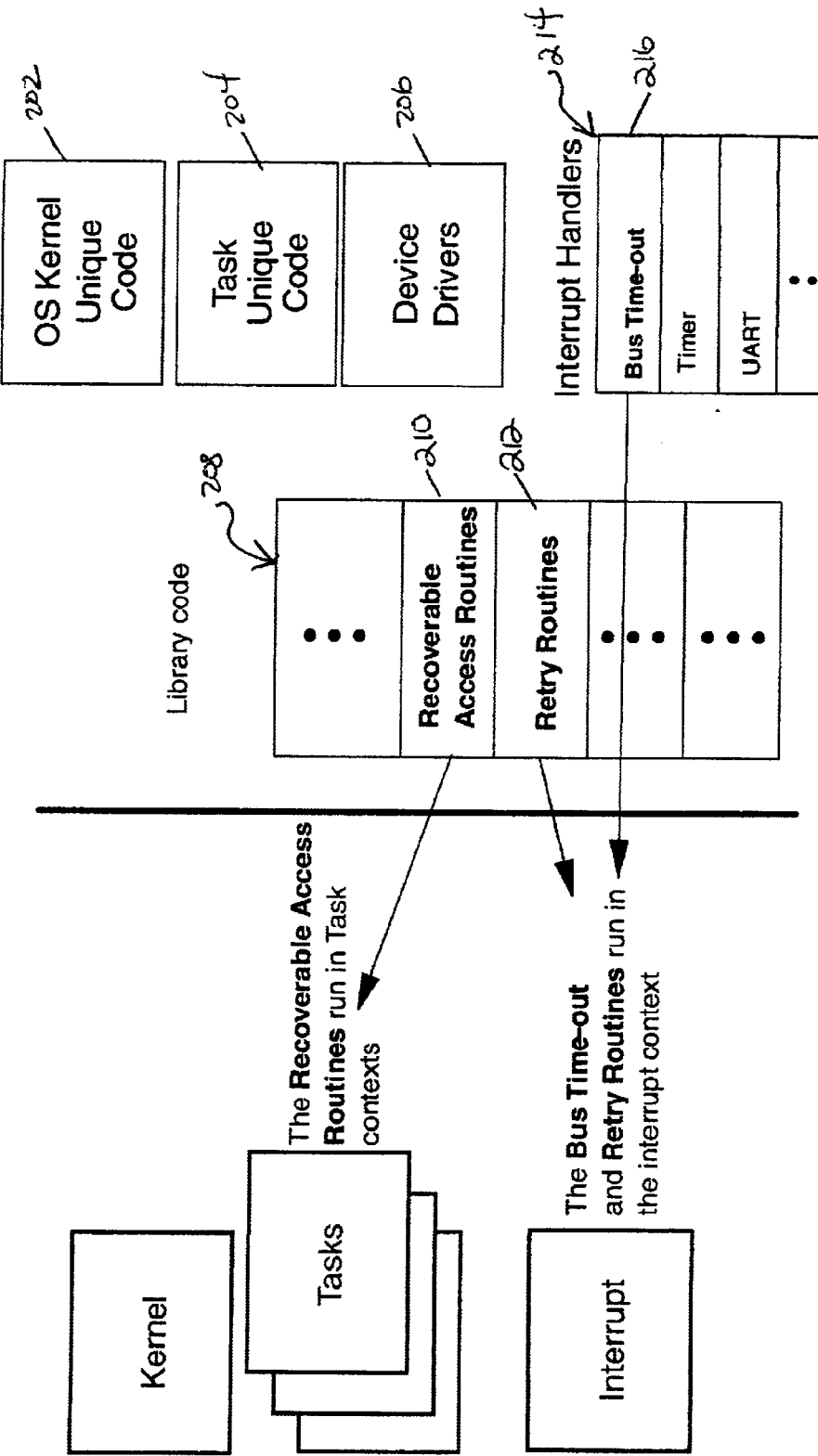
FIG. 2 is a block diagram of the software structure of the method for managing peripheral bus timeouts in accordance with the present invention.

FIG. 2 is a block diagram of the software structure of the method for managing peripheral bus timeouts in accordance with the present invention. The software structure is described with an illustration of the logical organization of the software code, illustrated in the right portion of FIG. 2, and the contexts of the microprocessor operating system (OS) in which the code executes, illustrated in the left portion of FIG. 2. The code organization comprises the OS kernel unique code 202, task unique code 204, and device drivers 206, which are not shared by multiple programs. There is a task unique code 204 for each task performed by the device 100. The code organization also comprises library code 208 which is shared by multiple programs. The library code 208 comprises a plurality of routines, including the recoverable access routine 210 and the retry routine 212. Also included in the code organization are interrupt handlers 214. For each type of interrupt, there is a specific interrupt handler. The bus timeout interrupt handler 216 is utilizes by the method in accordance with the present invention. The recoverable access routine 210, the retry routine 212, and the bus timeout interrupt handler 216 will be further described below.

The OS contexts comprise the kernel, tasks, and interrupt contexts. Contexts are defined by the state of the microprocessor 108 and the state of certain controlled data structures. The theory of OS contexts are well known in the art and will not be further described here. In the method in accordance with the present invention, to perform a task, the OS exits the kernel context and enters the tasks context. The recoverable access routine 210 is called during the task context. When an interrupt occurs, the OS enters the interrupt context. The bus timeout interrupt handler 216 is loaded, and the retry routine 212 is called, during the interrupt context.

Figure 3:
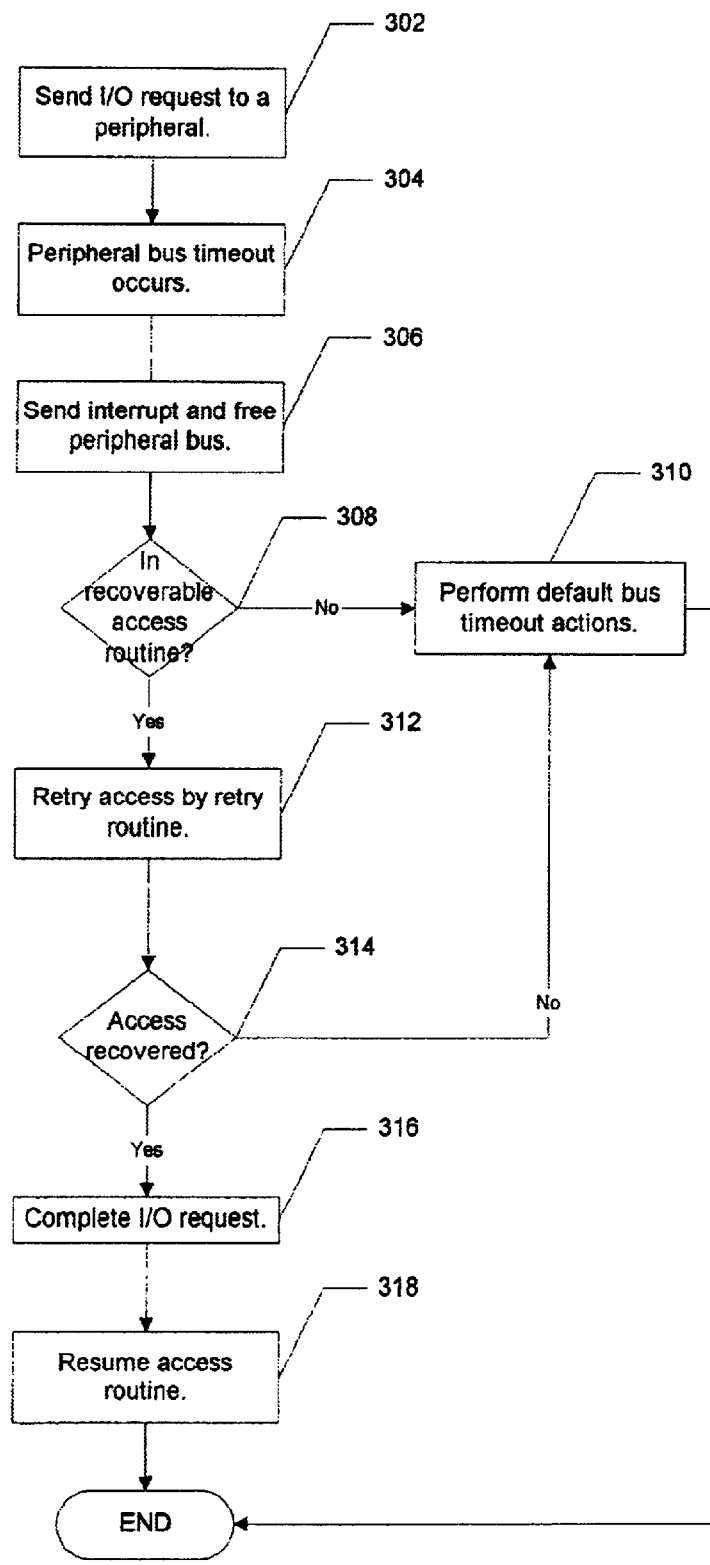
FIG. 3 is a flowchart illustrating a preferred embodiment of the method for managing peripheral bus timeouts in accordance with the present invention.

FIG. 3 is a flowchart illustrating a preferred embodiment of the method for managing peripheral bus timeouts in accordance with the present invention. The method will be described also with reference to FIGS. 1 and 2. First, an I/O request for the performance of a task is sent by the microprocessor 108 to a peripheral 104 via the peripheral bus 106, via step 302. In the preferred embodiment, the recoverable access routine 210 is called by the task code in the task context to send the I/O request if the peripheral 104 to be accessed is prone to a hung condition. If the peripheral 104 is not prone to a hung condition, for example, if the peripheral 104 is not a complex ASIC, then it may be more efficient to use a simple write request or a simple read request. The recoverable access routine 210 uses "safe write" and "safe read" requests, i.e., interruptible write and read requests. When a peripheral bus timeout occurs, via step 304, the hung bus detector 110 sends an interrupt signal 116 to the microprocessor 108, via step 306. In the preferred embodiment, the hung bus detector 110 frees the peripheral bus from the hung condition, but other ways of freeing the peripheral bus may be used without departing from the spirit and scope of the present invention. The OS of the microprocessor 108 then enters the interrupt context. Then, the bus timeout interrupt handler 216 determines if the interrupt occurred during the execution of the recoverable access routine 210, via step 308. If the interrupt did not occur during the execution of the recoverable access routine 210, then the default bus timeout actions are performed, via step 310, such as resetting the device hardware or terminating all or part of the task. If the interrupt occurred during the execution of the recoverable access routine 210, then access to the peripheral 104 is retried by the retry routine 212, via step 312, while in the interrupt context. If access could not be recovered, via step 314, then the default bus timeout actions are performed, via step 310. If access was recovered, via step 314, then the I/O request is completed by the retry routine 212, via step 316, and the recoverable access routine 210 is resumed in the task context to complete the task, via step 318.

In this manner, the I/O request can be completed even when the peripheral 104 is too busy to complete the request before the bus time-out timer expires. A failure or error of the device 100 need not be assumed, as with the prior art. Thus, by sending the I/O request with the recoverable access routine 210, and completing the I/O request with the retry routine 212, unnecessary resetting of the hardware is avoided.

Figure 4:
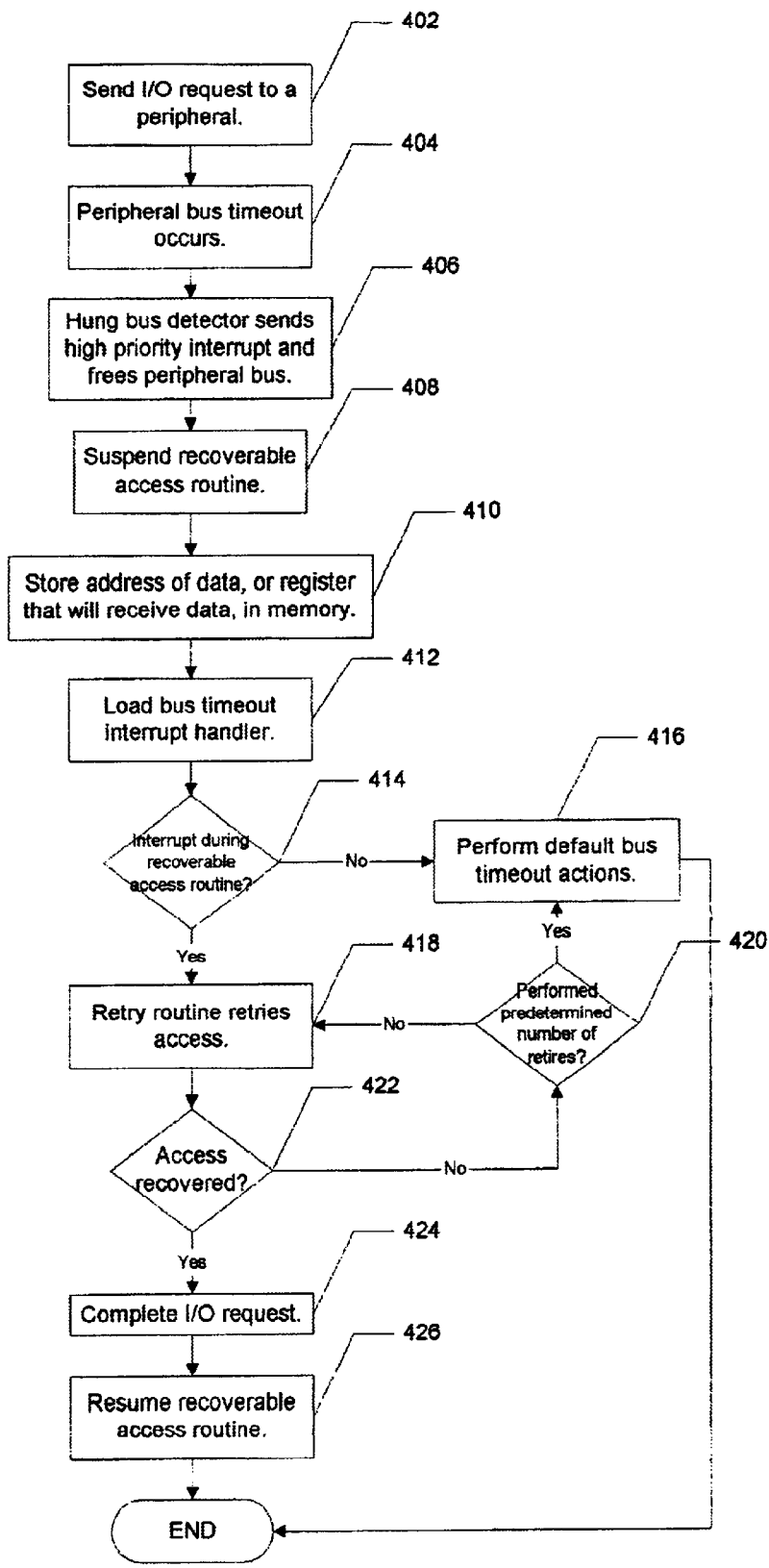
FIG. 4 is a flowchart illustrating in more detail the preferred embodiment of the method for managing peripheral bus timeouts in accordance with the present invention.

FIG. 4 is a flowchart illustrating in more detail the preferred embodiment of the method for managing peripheral bus timeouts in accordance with the present invention. First, in the task context, an I/O request for the performance of a task is sent by the microprocessor 108 to the peripheral 104, via step 402. Either a simple write/read request or the recoverable access routine 210 may be used to send the I/O request, as explained above. When the bus timeout occurs, via step 404, the hung bus detector 110 sends a high priority interrupt signal 116 to the microprocessor 108, via step 406. The recoverable access routine 210 is then suspended, via step 408. The OS enters the interrupt context. Along with the interrupt, the hung bus detector 110 asserts its own bus ready signal 114 onto the peripheral bus 106. This frees the microprocessor 108 from the I/O request so that other requests may be performed. However, there is a lag time between the time the bus timeout occurs and the time the bus timeout interrupt signal 116 is detected by the microprocessor 108. During this lag time, the microprocessor 108 may execute pipelined instructions based on the incorrect assumption that the I/O request completed successfully. To address this issue, the recoverable access routine 210 fills the pipeline with enough "no operation" (NOP) instructions after the I/O request to account for the interrupt lag. The microprocessor 108 may also perform bus operations out of order or load the bus transaction queue with I/O requests during the lag. To address this issue, the recoverable access routine 210 uses I/O synchronization instructions to serialize I/O operations. If these special instructions are not available, then dummy I/O instructions may be used in the code so that benign I/O operations are performed during the interrupt lag. NOP instructions, I/O synchronization instructions, and dummy I/O instructions are well known in the art and will not be further described here.

When the recoverable access routine 210 is suspended, via step 408, the address of the data to read or write, and the data (in the case of a write) or the location or register that will receive the data (in the case of a read), are stored in registers or memory locations known to the retry routine 212, via step 410. Once the recoverable access routine 210 is suspended, the microprocessor 108 determines that the interrupt was asserted by the hung bus interrupt 110 and loads the bus timeout interrupt handler 216, via step 412. The bus timeout interrupt handler 216 determines if the interrupt occurred during the execution of the recoverable access routine 210, via step 414. In the preferred embodiment, the beginning and ending addresses of the recoverable access routine 210 is known by the bus timeout interrupt handler 216. For example, if the OS runs with a flat memory address space, i.e., no memory management, then the beginning and end of the recoverable access routine 210 may be tagged with a unique label. Thus, when the recoverable access routine 210 is compiled, its beginning and ending addresses is stored in a table accessible to the bus timeout interrupt handler 216. During execution, a pointer directed at the saved previous instruction may then be used by the bus timeout interrupt handler 216 to determine if the interrupt occurred between the beginning and the ending addresses for the recoverable access routine 210.

If the interrupt did not occur during the execution of the recoverable access routine 210, then the default bus timeout actions are performed, via step 416. If the interrupt did occur during the execution of the recoverable access routine 210, then the retry routine 212 retries access to the peripheral 104, via step 418. In retrying the access, the retry routine 212 uses the information stored in the registers or memory locations containing the address and data/register stored by the recoverable access routine 210 in step 410. The retry routine 212 retries access for a predetermined number of times, via step 420. If the retry routine 212 is not able to access the peripheral 104 after the predetermined number of retries, via step 420 and 422, then the default bus timeout actions are performed, via step 416. If the retry routine 212 is able to access the peripheral 104, via step 422, then the I/O request is completed, via step 424. The results of the I/O is then returned to the recoverable access routine 210. The OS returns to the task context, and the recoverable access routine 210 is then resumed to complete the task, via step 426.

An improved method and system for managing peripheral bus timeouts has been disclosed. The present invention provides a software method in which an input/output (I/O) request to a peripheral is sent by a recoverable access routine. When a bus timeout occurs, a hung bus detector asserts an interrupt signal. The peripheral bus is freed from the hung condition. The recoverable access routine is suspended, and a bus timeout interrupt handler is then loaded. The interruption frees the microprocessor from the processing of the I/O request so that other requests may be performed. During the suspension of the recoverable access routine, a retry routine retries the I/O request. If the retry routine is successful in completing the I/O request, the result of the request is provided to the recoverable access routine, and the recoverable access routine is resumed to complete the task. In this manner, a peripheral bus timeout is managed without the need to reset the device hardware.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing peripheral bus timeouts, comprising the steps of:
    (a) determining if a peripheral is prone to a hung condition;
    (b) executing a recoverable access routine to send a request in the performance of a task from a processor to the peripheral, if the peripheral is prone to the hung condition;
    (c) determining that a peripheral bus timeout occurred;
    (d) sending an interrupt signal;
    (e) retrying for an access to the peripheral;
    (f) completing the request if the retry for the access to the peripheral is successful; and
    (g) resuming the performance of the task.

2. The method of claim 1, wherein the request is an interruptible write request.

3. The method of claim 1, wherein the request is an interruptible read request.

4. The method of claim 1, wherein the sending step (d) comprises:
    (d1) sending a high priority interrupt signal by a hung bus detector;
    (d2) suspending the execution of the recoverable access routine;
    (d3) freeing the peripheral bus.

5. The method of claim 4, wherein the suspending step (d2) further comprises:
    (d2i) storing an address for the request;
    (d2ii) storing a data for the request if the request is an interruptible write request; and
    (d2iii) storing a location to receive a data read if the request is an interruptible read request.

6. The method of claim 4, further comprising:
    (d1i) loading a bus timeout interrupt handler; and
    (d1ii) determining if the high priority interrupt signal was sent during the execution of the recoverable access routine.

7. The method of claim 6, wherein the determining step (d1ii) comprises:
    (d1iiA) determining an address stored in a saved previous instruction pointer; and
    (d1iiB) determining if the address is between a beginning address and an ending address of the recoverable access routine.

8. The method of claim 1, wherein the retrying step (e) comprises:
    (e1) obtaining an address for the request;
    (e2) obtaining a data for the request if the request is a write request;
    (e3) obtaining a location to receive a data read if the request is a read request; and
    (e4) retrying for the access to the peripheral using the address, and the data or the location, by a retry routine.

9. The method of claim 8, wherein the retrying step (e4) is repeated a plurality of times.

10. The method of claim 1, wherein the completing step (f) further comprises:
    (f1) returning a result of the request to the recoverable access routine.

11. The method of claim 1, wherein the resuming step (g) comprises:
    (g1) resuming an execution of the recoverable access routine to perform the task.

12. A method for managing peripheral bus timeouts, comprising the steps of:
    (a) sending a request to a peripheral in a performance of a task;
    (b) determining that a peripheral bus timeout occurred;
    (c) sending an interrupt signal, comprising:

(c1) sending a high priority interrupt signal by a hung bus detector, comprising:
   (c1i) loading a bus timeout interrupt handler,
   (c1ii) determining if the high priority interrupt signal was sent during the execution of the recoverable access routine, and
   (c1iii) performing default bus timeout actions, and skipping steps (c2), (d), (e), and (f), if the high priority interrupt signal is not sent during the execution of the recoverable access routine;
(c2) suspending an execution of a recoverable access routine;
(c3) freeing the peripheral bus;
(d) retrying for an access to the peripheral;
(e) completing the request if the retry for the access to the peripheral is successful; and
(f) resuming the performance of the task.

13. A method for managing peripheral bus timeouts, comprising the steps of:
(a) sending a request to a peripheral in a performance of a task;
(b) determining that a peripheral bus timeout occurred;
(c) sending an interrupt signal;
(d) retrying for an access to the peripheral;
(e) completing the request if the retry for the access to the peripheral is successful, and
   (e1) performing default bus timeout actions, and skipping step (f), if the retrying for the access to the peripheral is not successful;
(f) resuming the performance of the task.

14. A method for managing peripheral bus timeouts, comprising the steps of:
(a) determining if a peripheral is prone to a hung condition;
(b) executing a recoverable access routine to send a request to the peripheral in a performance of a task if the peripheral is prone to the hung condition;
(c) determining that a peripheral bus timeout occurred;
(d) sending an interrupt signal by a hung bus detector;
(e) suspending the execution of the recoverable access routine;
(f) loading a bus timeout interrupt handler;
(g) determining by the bus timeout interrupt handler if the interrupt signal was sent during the execution of the recoverable access routine;
(h) retrying for an access to the peripheral by a retry routine, if the interrupt signal was sent during the execution of the recoverable access routine;
(i) completing the request if the retrying for the access to the peripheral is successful; and
(j) resuming the execution of the recoverable access routine to perform the task.

15. A computer readable medium with program instructions for managing peripheral bus timeouts, the instructions for:
(a) determining if a peripheral is prone to a hung condition;
(b) executing a recoverable access routine to send a request in the performance of a task from a processor to the peripheral, if the peripheral is prone to the hung condition;
(c) determining that a peripheral bus timeout occurred;
(d) sending an interrupt signal;
(e) retrying for an access to the peripheral;
(f) completing the request if the retry for the access to the peripheral is successful; and (g) resuming the performance of the task.

16. The medium of claim 15, wherein the request is an interruptible write request.

17. The medium of claim 15, wherein the request is an interruptible read request.

18. The medium of claim 15, wherein the sending instruction (d) comprises the instructions for:
(d1) sending a high priority interrupt signal by a hung bus detector;
(d2) suspending the execution of the recoverable access routine; and
(d3) freeing the peripheral bus.

19. The medium of claim 18, wherein the suspending instruction (d2) further comprises the instructions for:
(d2i) storing an address for the request;
(d2ii) storing a data for the request if the request is an interruptible write request; and
(d2iii) storing a location to receive a data read if the request is an interruptible read request.

20. The medium of claim 18, further comprising the instructions for:
(d1i) loading a bus timeout interrupt handler; and
(d1ii) determining if the high priority interrupt signal was sent during the execution of the recoverable access routine.

21. The medium of claim 20, wherein the determining instruction (d1ii) comprises the instructions for:
(d1iiA) determining an address stored in a saved previous instruction pointer; and
(d1iiB) determining if the address is between a beginning address and an ending address of the recoverable access routine.

22. The medium of claim 15, wherein the retrying instruction (e) comprises the instructions for:
(e1) obtaining an address for the request;
(e2) obtaining a data for the request if the request is a write request;
(e3) obtaining a location to receive a data read if the request is a read request; and
(e4) retrying for the access to the peripheral using the address, and the data or the location, by a retry routine.

23. The medium of claim 22, wherein the retrying instruction (e4) is performed a plurality of times.

24. The medium of claim 15, wherein the completing instruction (f) further comprises the instructions for:
(f1) returning a result of the request to the recoverable access routine.

25. The medium of claim 15, wherein the resuming instruction (g) comprises the instructions for:
(g1) resuming an execution of the recoverable access routine to perform the task.

26. A computer readable medium with program instructions for managing peripheral bus timeouts, the instructions for:
(a) sending a request to a peripheral in a performance of a task;
(b) determining that a peripheral bus timeout occurred;
(c) sending an interrupt signal, comprising:
   (c1) sending a high priority interrupt signal by a hung bus detector, comprising:
      (c1i) loading a bus timeout interrupt handler,
      (c1ii) determining if the high priority interrupt signal was sent during the execution of the recoverable access routine, and
      (c1iii) performing default bus timeout actions, and skipping instructions (c2), (d), (e), and (f), if the high priority interrupt signal is not sent during the execution of the recoverable access routine;

(c2) suspending an execution of a recoverable access routine;

(c3) freeing the peripheral bus;

(d) retrying for an access to the peripheral;

(e) completing the request if the retry for the access to the peripheral is successful; and (f) resuming the performance of the task.

27. A computer readable medium with program instructions for managing peripheral bus timeouts, the instructions for:

(a) sending a request to a peripheral in a performance of a task;

(b) determining that a peripheral bus timeout occurred;

(c) sending an interrupt signal;

(d) retrying for an access to the peripheral;

(e) completing the request if the retry for the access to the peripheral is successful, and (e1) performing default bus timeout actions, and skipping instruction (f), if the retrying for the access to the peripheral is not successful;

(f) resuming the performance of the task.

28. A computer readable medium with program instructions for managing peripheral bus timeouts, the instructions for:

(a) determining if a peripheral is prone to a hung condition;

(b) executing a recoverable access routine to send a request to a peripheral in a performance of a task if the peripheral is prone to the hung condition;

(c) determining that a peripheral bus timeout occurred;

(d) sending an interrupt signal by a hung bus detector;

(e) suspending the execution of the recoverable access routine;

(f) loading a bus timeout interrupt handler;

(g) determining by the bus timeout interrupt handler if the interrupt signal was sent during the execution of the recoverable access routine;

(h) retrying for an access to the peripheral by a retry routine, if the interrupt signal was sent during the execution of the recoverable access routine;

(i) completing the request if the retrying for the access to the peripheral is successful; and (j) resuming the execution of the recoverable access routine to perform the task.

* * * * *